(12) United States Patent
Allen et al.

(10) Patent No.: US 10,592,155 B2
(45) Date of Patent: Mar. 17, 2020

(54) LIVE PARTITION MIGRATION OF VIRTUAL MACHINES ACROSS STORAGE PORTS

(71) Applicant: International Business Machines Corporation, Armonk, NY (US)

(72) Inventors: James P. Allen, Austin, TX (US); Kiran Kumar Anumalasetty, Bangalore (IN); Sanket Rathi, Hyderabad (IN); Rajaboina Yadagiri, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/949,181

(22) Filed: Apr. 10, 2018

(65) Prior Publication Data
US 2019/0310790 A1 Oct. 10, 2019

(51) Int. Cl.
*G06F 3/06* (2006.01)
*G06F 13/16* (2006.01)

(52) U.S. Cl.
CPC .......... *G06F 3/0647* (2013.01); *G06F 3/0604* (2013.01); *G06F 3/067* (2013.01); *G06F 3/0644* (2013.01); *G06F 3/0664* (2013.01); *G06F 13/1668* (2013.01)

(58) Field of Classification Search
CPC .... G06F 3/0604; G06F 3/0644; G06F 3/0646; G06F 3/0647
See application file for complete search history.

(56) References Cited

U.S. PATENT DOCUMENTS

| 8,880,821 | B1* | 11/2014 | Li | G06F 3/061 |
| | | | | 711/162 |
| 8,977,888 | B1* | 3/2015 | Bafna | G06F 11/1415 |
| | | | | 714/4.11 |
| 9,647,933 | B1 | 5/2017 | Tawri et al. | |
| 9,755,991 | B2* | 9/2017 | Anumalasetty | H04L 41/082 |
| 9,826,030 | B1* | 11/2017 | Dhoolam | H04L 67/1008 |
| 10,083,053 | B2* | 9/2018 | Dong | G06F 13/32 |
| 10,225,326 | B1* | 3/2019 | Puchala | H04L 67/10 |

(Continued)

OTHER PUBLICATIONS

Avita Katal, Niharika Gupta, Seepaj Sharma, and R. H. Goudar, Information Storage on the Cloud: A Survey of Effective Storage Management System, IEEE Xplore 2012 (Year: 2012).*

*Primary Examiner* — Khoa D Doan
(74) *Attorney, Agent, or Firm* — Scully, Scott, Murphy & Presser, P.C.

(57) ABSTRACT

A system and method for transferring a logical partition is provided that includes (i) a source server having a logical partition and at least one virtualized port for communication with at least one physical access port; (ii) a target server having at least one physical access port; and (iii) a storage server having a plurality of access ports, where a first access port is configurable to be in communication with the source server and a second, different access port is configurable to be in communication with the target server, wherein the logical partition has a first I/O path that includes the first access port of the storage server, and wherein the system and method is configurable to create a second I/O path for the logical partition that includes the second access port of the storage server.

20 Claims, 6 Drawing Sheets

(56) References Cited

U.S. PATENT DOCUMENTS

| | | | |
|---|---|---|---|
| 2003/0005119 A1* | 1/2003 | Mercier | G06F 3/0601 709/225 |
| 2003/0188035 A1* | 10/2003 | Lubbers | G06F 11/1666 719/310 |
| 2008/0177947 A1* | 7/2008 | Eguchi | G06F 3/061 711/114 |
| 2008/0270670 A1* | 10/2008 | Usami | G06F 11/1456 710/316 |
| 2009/0307378 A1* | 12/2009 | Allen | H04L 47/10 710/4 |
| 2009/0307429 A1* | 12/2009 | Takada | G06F 12/0804 711/118 |
| 2009/0307456 A1* | 12/2009 | Patwari | G06F 9/5016 711/173 |
| 2010/0095080 A1* | 4/2010 | Bauman | G06F 9/5077 711/165 |
| 2010/0122111 A1* | 5/2010 | Allen | G06F 11/2005 714/3 |
| 2010/0122124 A1* | 5/2010 | Chen | G06F 9/45558 714/57 |
| 2010/0122249 A1* | 5/2010 | Anderson | G06F 9/45533 718/1 |
| 2010/0293552 A1* | 11/2010 | Allen | G06F 9/5077 718/105 |
| 2011/0161725 A1* | 6/2011 | Allen | G06F 11/1443 714/5.11 |
| 2012/0036214 A1* | 2/2012 | Pafumi | G06F 9/4856 709/215 |
| 2013/0282887 A1* | 10/2013 | Terayama | G06F 9/45533 709/223 |
| 2013/0282979 A1* | 10/2013 | Suzuki | G06F 3/061 711/114 |
| 2013/0339647 A1* | 12/2013 | Jindo | G06F 3/0617 711/165 |
| 2014/0059302 A1* | 2/2014 | Hayakawa | G06F 3/0644 711/153 |
| 2014/0068210 A1* | 3/2014 | Deguchi | G06F 9/5027 711/162 |
| 2014/0245293 A1* | 8/2014 | Tsirkin | G06F 9/455 718/1 |
| 2014/0351538 A1* | 11/2014 | Kono | G06F 11/1458 711/162 |
| 2015/0121004 A1* | 4/2015 | Hatasaki | G06F 13/10 711/114 |
| 2015/0150000 A1* | 5/2015 | Anumalasetty | G06F 3/06 718/1 |
| 2015/0227322 A1* | 8/2015 | Noda | G06F 11/00 710/74 |
| 2015/0277803 A1 | 10/2015 | Nakajima | |
| 2015/0365274 A1* | 12/2015 | Anumalasetty | H04L 41/082 709/221 |
| 2016/0077938 A1* | 3/2016 | Keeriyadath | G06F 11/2002 714/4.11 |
| 2017/0295230 A1* | 10/2017 | Hatfield | H04L 45/02 |
| 2018/0157537 A1* | 6/2018 | Chen | G06F 9/5077 |
| 2019/0108157 A1* | 4/2019 | Nakagawa | G06F 3/0665 |

* cited by examiner

LIVE PARTITION MIGRATION OF VIRTUAL MACHINES ACROSS STORAGE PORTS

BACKGROUND OF THE INVENTION

The present invention relates generally to the field of computer resource virtualization, and more particularly to live partition migration between physical computing systems.

Computer systems typically include a combination of hardware and software components, application programs, operating systems, processors, buses, memory, input/output devices, etc. One area of advancement includes data centers providing cloud services with various types of virtualization services. Most computer virtualization systems and services create logical partitions (LPARs), also referred to as virtual machines (VM), on a computer system, such as, for example, a computer server. The virtual machine or logical partition (LPAR) is generally a software-based emulation of a physical computer. Most virtualization services make use of massive amounts of data input/output (I/O) traffic and network bandwidth. The massive amounts of data are usually stored in a network of storage devices that may be linked together and accessed through a storage area network (SAN). The storage area network (SAN) is divided into logical units identified by logical unit numbers (LUNs). The virtual machine or LPAR accesses necessary storage devices or LUNs using virtual ports which correspond to physical ports on the host computer server that are connected to the storage area network (SAN). Each virtual connection between the virtual machine or LPAR has a World Wide Port Name (WWPN). The virtual machine or LPAR uses the WWPN to access one or more LUNS via the storage area network (SAN).

Logical partition migration (LPM) allows a system administrator or other user to migrate a logical partition (LPAR), or virtual machine (VM), from one server computer (source server computer), or central electronics complex (CEC), to another server computer (destination server computer) or another CEC. The virtual machine (VM) or LPAR that is being moved in the LPM operation is known as the "mobile partition." In such virtualized computing environments, logical partition mobility or migration (LPM), preferably live partition mobility, in which a logical partition (LPAR), or virtual machine (VM), executing on a first host computer server is migrated to a second host (target or destination) computer server, may be performed for a number of reasons, including to avoid outages for planned server maintenance, for load balancing across multiple servers, for energy conservation, and the like.

SUMMARY

The summary of the disclosure is given to aid understanding of a computer system, virtualized computer architectural structure, and method of performing logical partition migration (LPM), preferably live partition mobility, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure and method of operation to achieve different effects.

According to an embodiment, a method for transferring a logical partition from a source server to a destination server is provided. An embodiment may also include a method of migrating resources in a computing environment, the computing environment comprising a source system and a target system, the method comprising initiating a transfer of a logical partition on the source system to the target system, creating a new I/O path for the logical partition on the source system while the logical partition resides on the source system, and transferring the logical partition from the source system to the target system. The method in an embodiment further comprising a storage server for storing data wherein the source system is configured to access the storage server and the target system is configured to access the storage server, the method further comprising determining whether the source system accesses the storage server from the same access port that the target server accesses the storage server, and if the source system accesses the storage server from a different access port then the target system, then the new I/O path for the logical partition on the source server is configured to include the access port of the target system.

In another embodiment, a system providing for the transfer of a logical partition is provided. The system in an embodiment includes a source server having a logical partition and a Virtualized Input/Output Server (VIOS), the source server having at least one physical access port, and the logical partition having at least one virtualized port for communicating with the at least one physical access port. The system according to an embodiment further includes (i) a target server having a Virtualized Input/Output Server (VIOS) where the target server has at least one physical access port, and (ii) a storage server having storage data and a plurality of access ports, wherein a first access port is configurable to be in communication with the source server and a second access port, different than the first access port, is configurable to be in communication with the target server, wherein the logical partition has a first I/O path that includes the first access port of the storage server, and wherein the system is configured to create a second I/O path for the logical partition while the logical partition is on the source server that includes the second access port of the storage server.

In yet another embodiment, a computer system for transferring a logical partition from a source server to a destination server is provided. The computer system in an embodiment includes one or more computer processors, one or more computer readable non-transitory storage media and program instructions stored on the one or more computer readable non-transitory storage media for execution by at least one of the one or more computer processors. The program instructions in an embodiment include program instructions to initiate transfer of the logical partition from the source server to the destination server, program instructions to create a new I/O path for the logical partition on the source system that includes the target port of the destination server, and program instructions to transfer the logical partition from the source server to the destination server.

BRIEF DESCRIPTION OF THE DRAWINGS

The various aspects, features and embodiments of the computer system, computer architectural structure, and its method of operation will be better understood when read in conjunction with the figures provided. Embodiments are provided in the figures for the purpose of illustrating aspects, features and/or various embodiments of the computer system, computer architectural structure, and method of operation, but the claims should not be limited to the precise arrangement, structures, features, aspects, embodiments or devices shown, and the arrangements, structures, subassemblies, features, aspects, methods, processes, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, and method of operation, however, it will be understood by those skilled in the art that different and numerous embodiments of the computer system, computer architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Common types of computing devices are desktop computers and server systems. As for information and data storage, an increasingly common technology is referred to as storage area networking, or simply storage area network (SAN). SAN technology comprises connecting remote computer storage devices, such as disk arrays and optical storage arrays, to servers and other computing devices in such a way that the storage devices preferably appear as locally attached devices to the computing devices and the operating system which share the storage devices.

The storage devices or portions of storage devices may be divided into logical units. A logical unit may be referred to as a LUN, which in various contexts refers to the logical unit number of a logical unit. A logical unit may be used to refer to one or more disks or other physical storage devices or only a portion of a storage device, e.g., a portion of a SCSI storage device. Storage server(s) or storage area networks (SAN) may have one or more logical units or LUNs.

Fibre channel switches often connect servers and other computing devices to SANs. In a conventional fibre channel SAN, an Input/Output Controller or Host Bus Adapter (HBA) includes an N_Port connected to a fibre channel switch or storage devices via a fibre channel link. N_Port ID Virtualization (NPIV) is a method for virtualizing a physical fibre channel port. Using NPIV, multiple virtual machines (VMs), also referred to as logical partitions, LPARs, or NPIV clients, can be created and have access to the storage area network (SAN) or storage server. NPIV allows a fabric-attached N_Port to claim multiple fibre channel addresses. Each virtual connection between the virtualized machine or LPAR and the storage device or SAN is provided a World Wide Port Name (WWPN) and each address appears as a unique entity on the fibre channel fabric. The virtual machines will have a virtual fibre channel port and will be able to access the storage on the SAN similar to how physical ports access storage on the SAN. Utilizing NPIV, multiple World-Wide Port Names (WWPNs) and fibre channel addresses recognizable by the fibre channel switch can be assigned to a single physical channel link and N_Port.

As indicated earlier, virtual machines from one computer server (source server) can be migrated to another computer server (target or destination server) using logical partition mobility (migration) or LPM. Preferably the logical partitions can be migrated while they are live, e.g., operational. One prerequisite for known methods of migrating logical partitions between computer servers is that the destination or target server should have access to all the LUNs on the storage server (the SAN) that are accessible to the source server. Storage servers in the storage area network (SAN) have multiple ports (called target ports in SCSI terminology) and the LUNs on the storage server (e.g., the SAN) are accessible to the host (source) servers through the storage server ports. In a SAN configuration there may be multiple I/O paths to reach a LUN from a host server. An I/O path is the information or configuration to access a LUN. An I/O path is a combination of initiator, target port, and LUN. So in the case of a virtual machine on a server (e.g., source server), the initiator is the virtual machine (e.g., the virtual port of the virtual machine), the target port is the storage port of the SAN or storage server, and the LUN may be a disk on the storage server (or SAN). If one of the I/O path fails, then the I/O path may switch to other available paths.

Figure 1:
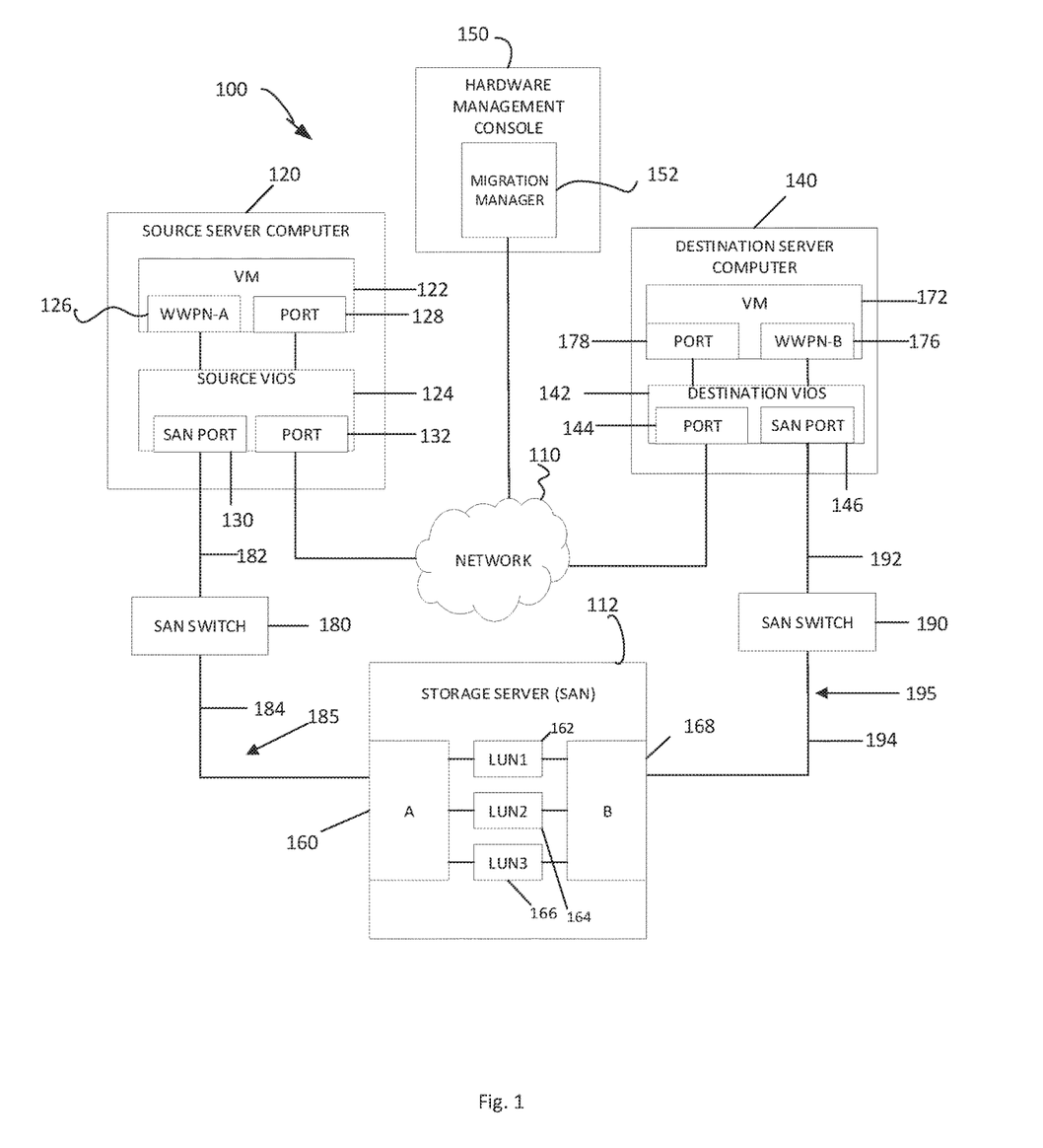
FIG. 1 is a functional block diagram illustrating a virtualized server computing environment, in accordance with an embodiment of the present invention.

Because of different SAN configurations, it is possible that a LUN or set of LUNs are accessible to the source server through target port A and the same LUN or set of LUNs are accessible to the destination server through a different target port, e.g., target port B. FIG. 1 illustrates this environment where target ports A and B (i.e., target ports 160 and 168) have different WWPNs.

FIG. 1 is a functional block diagram illustrating a virtualized server computing environment ("environment"), generally designated 100, in accordance with an exemplary embodiment. Environment 100 includes source server computer 120, destination server computer 140, and optional hardware management console 150, all interconnected via network 110. Environment 100 also includes storage server or storage area network (SAN) 112, which may include for example a small system computer interface (SCSI) storage device, which is connected to source server computer 120 and destination server computer 140 via storage area network (SAN) 112. While FIG. 1 illustrates two servers, it can be appreciated that virtualized computing environment 100 may include two or more servers.

Network 110 may be, for example, a local area network (LAN), a wide area network (WAN), such as the Internet, a dedicated short range communications network, or any combination thereof, and may include wired, wireless, fiber optic, or any other connection known or as of yet unknown in the art. In general, the communication network can be any combination of connections and protocols that will support communication between source server computer 120 and destination server computer 140. In the exemplary embodiment depicted in FIG. 1, network 110 represents connections between source server computer 120 and destination server computer 140, using standard Ethernet connections.

In various embodiments, source server computer 120, destination server computer 140, and hardware management console (HMC) 150 can each be a server, a laptop computer, a tablet computer, a netbook computer, a personal computer (PC), or a desktop computer. Other computing devices are contemplated for source server 120, destination server 140, and/or HMC 150. In another embodiment, source server computer 120, destination server computer 140, and hardware management console 150 represent one or more computing systems utilizing clustered computers and components to act as a single pool of seamless resources when accessed via network 110. In general, hardware management console 150 can be any computing device or a combination of devices capable of executing and having access to migration manager program 152. Hardware management console 150 may include internal and external hardware components, as depicted and described in further detail with respect to FIG. 6.

Source server computer 120 includes virtual machine (VM) 122 and source virtual input/output server (VIOS) 124. VM 122 is a virtual computing environment. Source computer 120 may also include other components, physical and/or virtualized, including, for example, a hypervisor. In an exemplary embodiment, VM 122 represents a logical partition (LPAR) or NPIV client, which is a software-based emulation of a physical computer. VM 122 may be a system LPAR, in which a complete system platform supports the execution of a complete operating system, including using virtualized hardware (e.g., virtualized I/O ports). In an embodiment, source server computer 120 may include one or more LPARs, and one or more mobile partitions, which are specific LPARs that are subject to an imminent live partition migration in which the mobile partition is moved from a source server computer (e.g., source server computer 120) to a destination server computer (e.g., destination server computer 140). In general, VM 122 can be any LPAR that can access storage area network (SAN) 112 and can undergo migration or transfer operation from a source server computer (e.g., source server computer 120) to a destination server computer (e.g., destination server computer 140).

VM 122 includes WWPN-A 126 and port 128. WWPN-A 126 is a virtual port used by VM 122 to communicate with storage server or storage area network (SAN) 112. In the exemplary embodiment, WWPN-A 126 is a virtual Fibre channel port that VM 122 generates for use in a virtual Fibre channel fabric, and identified by the name "WWPN-A". In general, WWPN-A 126 can have any unique identifier used to denote the virtual port in a VM (e.g., VM or LPAR 122) on a source server computer (e.g., source server computer 120). Port 128 is a virtual port in VM 122 that facilitates communication between VM 122 and other computer systems (e.g., hardware management console 150 and/or destination server computer 140). In the exemplary embodiment, port 128 is a virtual Ethernet port that supports communication between VM 122 and other computer systems (e.g., hardware management console 150 and/or destination server computer 140) via network 110. In general, port 128 can be any virtualized port utilized by VM 122 to communicate with computer systems via network 110.

Source VIOS 124 is a virtualized I/O server which allows source server computer 120 to generate one or more "virtual" I/O ports, which correspond to one or more physical ports. In the exemplary embodiment of FIG. 1, source VIOS 124 uses virtual networking to map one or more physical ports on source server computer 120 (e.g., port 132) to one or more VMs (e.g., VM or LPAR 122) via one or more virtual ports (e.g., port 128). In general, source VIOS 124 can be implemented with any technology that enables one physical network adapter (such as a network adapter card, or Ethernet port) to simulate multiple virtual network adapters that are compatible with one or more VMs (e.g., VM or LPAR 122) on a source server computer (e.g., source server computer 120).

Source VIOS 124 also includes SAN port 130 and port 132. In the exemplary embodiment of FIG. 1, SAN port 130 is a physical port that facilitates communication between VM 122 and storage area network (SAN) 112. In this embodiment, SAN port 130 is a physical Fibre channel port that communicates with VM 122 via a virtual Fibre channel connection addressed to WWPN-A 126, which is a virtual Fibre channel port within VM 122. In general, SAN port 130 can be any physical port that facilitates communication between a virtual machine or LPAR on a source server computer and one or more fibre channel switches or one or more storage devices or logical units (LUNs) via a storage server or storage area network (SAN).

Port 132 is a physical port on source server computer 120. In the exemplary embodiment, port 132 is a physical Ethernet port that supports communication between VM 122, via communication with port 128, and other computer systems (e.g., hardware management console 150 and destination server computer 140) via network 110. In general, port 132 can be any physical port in a source server computer that can facilitate communication between a VM and other computer systems via network 110.

Destination server computer 140 includes virtual machine (VM) 172 and destination VIOS 142. Destination computer 140 may include other components, physical and/or virtualized, including, for example, a hypervisor. VM 172 is a virtual computing environment. In an exemplary embodiment, VM 172 represents partition (LPAR) or NPIV client, which is a software based emulation of a computer. VM 172 may be a system LPAR, in which a complete system platform supports the execution of a complete operating system, including using virtualized hardware (e.g., virtualized I/O ports). In an embodiment, destination server computer 140 can include one or more LPARs, and one or more mobile partitions.

VM 172 includes WWPN-B 176 and port 178. WWPN-B 176 is a virtual port used by VM 172 to communicate with storage server or storage area network (SAN) 112. In the exemplary embodiment, WWPN-B 176 is a virtual Fibre channel port that VM 172 generates for use in a virtual Fibre channel fabric, and identified by the name "WWPN-B". In general, WWPN-B 176 can have any unique identifier used to denote the virtual port in a VM (e.g., VM or LPAR 172) on a destination server computer (e.g., destination server computer 140). Port 178 is a virtual port in VM 172 that facilitates communication between VM 172 and other computer systems (e.g., hardware management console 150 and/or source server computer 120). In the exemplary embodiment, port 178 is a virtual Ethernet port that supports communication between VM 172 and other computer systems (e.g., hardware management console 150 and/or source server computer 120) via network 110. In general, port 178 can be any virtualized port utilized by VM 172 to communicate with computer systems via network 110.

In an exemplary embodiment, destination VIOS 142 is a virtualized I/O server which allows destination server computer 140 to generate one or more "virtual" I/O ports, which correspond to one or more physical ports. In the exemplary embodiment of FIG. 1, destination VIOS 142 uses virtual networking to map one or more physical ports on destination server computer 140 (e.g., port 144) to one or more VMs 172 via one or more virtual ports (e.g., port 178). In various embodiments, destination VIOS 142 can utilize one or more physical ports to facilitate communication between VM 172. In some embodiments, destination VIOS 142 includes the same types of physical ports as source VIOS 124 (e.g., port 144 is of the same type as port 132 (Ethernet)). In general, destination VIOS 142 can be any technology that enables one physical network adapter (such as a network adapter card, or Ethernet port) to simulate multiple virtual network adapters that are compatible with one or more VMs on a destination server computer (e.g., destination server computer 140).

Destination VIOS 142 includes port 144 and SAN port 146. In the exemplary embodiment of FIG. 1, port 144 is a physical port in destination server computer 140 and facilitates communication between destination server computer 140 and source server computer 120, and optionally hardware management console 150, via network 110. As such, in the exemplary embodiment, port 144 is of the same type as port 132 (i.e., Ethernet). In general, port 144 can be any type of physical port which corresponds to a physical port in a destination server computer and facilitates communication between the destination server and source server via a network. In the exemplary embodiment of FIG. 1, SAN port 146 is a physical port on destination server computer 140 that can facilitate communication between VM 172 and storage area network (SAN) 112. In the exemplary embodiment, SAN port 146 is a Fibre channel port that can communicate with VM 172 on destination server computer 140 via a virtual connection addressed to a virtual port identified by WWPN-B 176. In general, SAN port 146 can be any physical port that facilitates communication between a VM on a destination server computer and a storage area network (SAN).

Storage area network (SAN) 112 can be, for example, an advanced technology attachment over Ethernet network (ATA over Ethernet or AoE), a Fibre channel protocol network, an enterprise systems connection (ESCON), a Fibre channel over Ethernet (FCoE), an HyperSCSI network, or any other type of storage area network for communication between server computers (e.g., source server computer 120 and destination server computer 140) and storage area network devices (e.g., SCSI storage device). In the exemplary embodiment of FIG. 1, storage server or storage area network (SAN) 112 is a Fibre channel protocol that maps over a Fibre channel connection.

A storage area network (e.g., storage area network 112) may include one or more storage devices. The storage devices may be quite numerous and/or heterogeneous. Such storage devices may include tape libraries, a single or groups of disk drives (e.g., Just a Bunch of Disks or JBOD) solid state memory devices, optical drives, storage arrays, etc. In general, a storage device in storage server or SAN 112 can be any storage unit that supports read/write operations. In the exemplary embodiment, the storage device is a dedicated storage SCSI device, such as a disk array, tape library, or optical jukebox. Storage virtualization techniques establish relationships between physical storage devices, e.g., disk drives, tape drives, optical drives, etc., and virtual or logical storage devices such as logical units or LUNs. In the exemplary embodiment, storage server or SAN 112 has one or more logical units, such as, for example, logical unit numbers (LUNs) 162, 164, and 166 as shown in FIG. 1. In the exemplary embodiment, logical unit numbers (LUNs) 162, 164, and 166 can be any number used to identify a storage device or a logical unit (i.e., subdivision) thereof.

Source computer 120 is connected to SAN 112 through SAN switch 180. More specifically, SAN port 130 of source server 120 is connected to SAN switch 180 by link 182, and SAN switch 180 is connected to port 160 of SAN 112 by link 184. Preferably, links 182 and 184 are fibre channel links, and SAN switch 180 is a fibre channel switch. In a similar manner, destination or target computer 140 is connected to SAN 112 through SAN switch 190. More specifically, SAN port 144 of destination server 140 is connected to SAN switch 190 by link 192, and SAN switch 190 is connected to port 168 of SAN 112 by link 194. Preferably, links 192 and 194 are fibre channel links, and SAN switch 190 is a fibre channel switch. The I/O path 185 for VM 122 on the source server 120 is WWPN-A 126, target port 160 on SAN 112, and LUNs 162, 164, and/or 166 on SAN 112. The I/O path 195 for VM 172 on destination server 140 is WWPN-B 178, target port 168 on SAN 112, and LUNs 162, 164, and/or 166 on SAN 112.

Hardware management console 150 is a computer hardware system used to manage the software configuration and operation of one or more LPARs within environment 100. Hardware management console 150 includes migration manager 152 to handle partition migration. The partition migration program directs the transfer of mobile partitions from source server computer 120 to destination server computer 140. Preferably, the transfer is a live migration of the partition from the source server to the destination server.

In the embodiment of FIG. 1, the host server 120, which includes VM 122, is connected to the LUNs 162, 164, and 166 of SAN 112 through port 160 while the destination server 140 is connected to the LUNs 162, 164, and 166 of SAN 112 through port 168, which have different WWPNs. That is, port 160 has a different WWPN than port 168. In the virtualization environment of FIG. 1, an attempt to migrate VM 122 in source server 120 to destination server 140 (i.e., attempt a LPM operation) will fail because when the VM 122 is migrated to the destination server 140 and the destination server 140 tries to reach LUNs 162, 164, and 166 using its active connection (e.g., I/O path 185), which is through target port 160, the destination server 140 cannot connect with the SAN 112 through target port 160 because destination server 140 is configured to connect and communicate with SAN 112 only though target port 168. In other words, the migration of VM 122 to the destination server 140 would not work because the migrated VM (mobile partition) 122' was configured to communicate with port 160 so the migrated VM now on destination sever 140 is configured to look for and communicate with port 160, but destination server 140 is not connected to port 160.

Disclosed is a system, computer architecture, and method to provide partition mobility or migration particularly in the environment where the source and destination servers have access to different ports of the storage server, e.g., as in FIG. 1 where source server 120 has access to target port 160 of the storage server and destination server 140 has access to different target port 168 of the storage server. A system, computer architecture, and method to transfer logical partitions or virtual machines is disclosed. When a migration or transfer process is initiated, in an embodiment, the system will determine whether or not the target port that the logical partition or virtual machine access the storage server (e.g., the access port on the storage server that the source server utilizes) is the same target port that the destination server uses to access the storage server. When a migration or transfer process is initiated, in an embodiment, the VM on which migration or a transfer process is initiated will be notified of the new target port which the target (destination) server utilizes to access SAN 112. For each LUN accessible through the access port the logical partition on the source server uses to access the SAN, e.g., target port 160 for source server 120, the VM to be migrated, e.g., the mobile partition, will create a new I/O path through the port the destination server uses to access the SAN, e.g., target port 168 on destination server 140. While the VM is on the source server, in an embodiment, this new I/O path will be configured to be in the "failed", "error", or "inactive" state. After the mobile (logical) partition is moved to the destination server where the logical partition or virtual machine can see the target port of the destination server, e.g., target port 168 of destination server 140, in an embodiment, the new I/O path will be activated.

Figure 2:
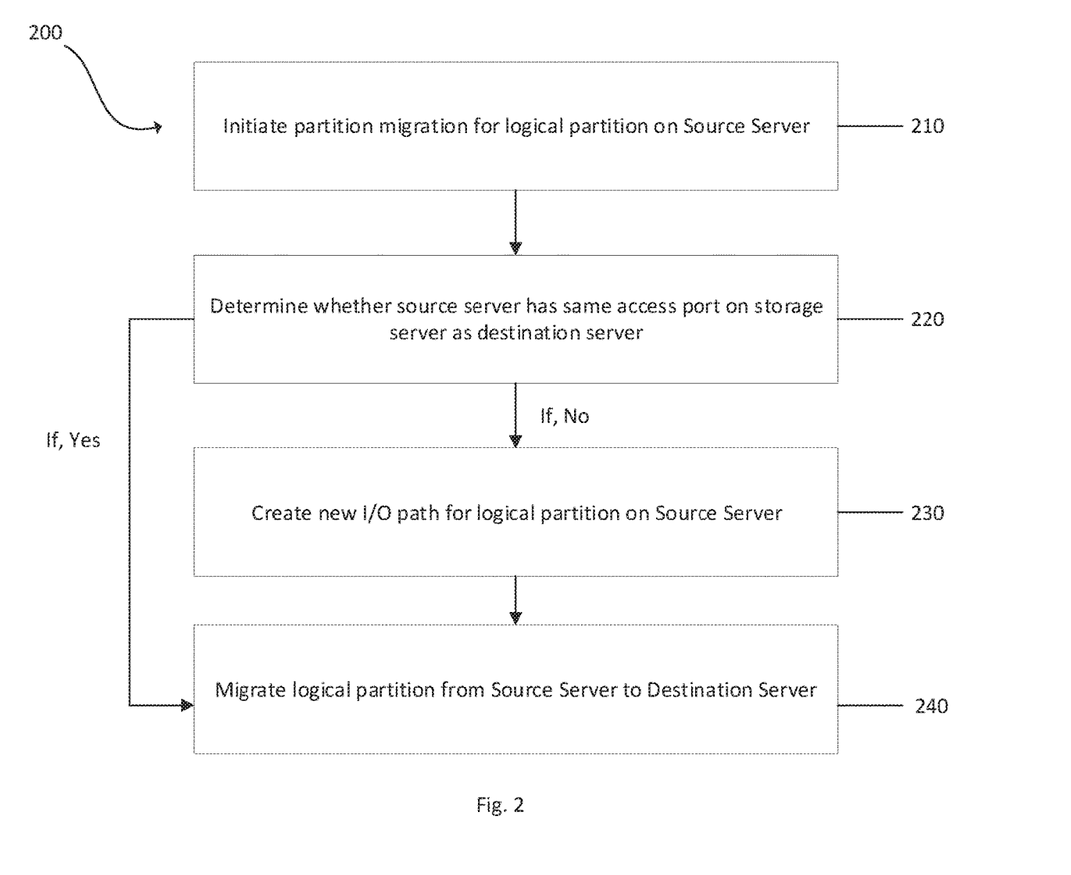
FIG. 2 is a flowchart depicting operational steps of a live partition migration within the environment of FIG. 1, in accordance with an embodiment of the present invention.

FIG. 2 is an exemplary flowchart in accordance with one embodiment illustrating and describing a method of performing partition migration or transfer in accordance with one embodiment of the present disclosure. While the migration method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, simultaneously, or the steps may be performed in the order disclosed or in an alternate order.

Figure 3:
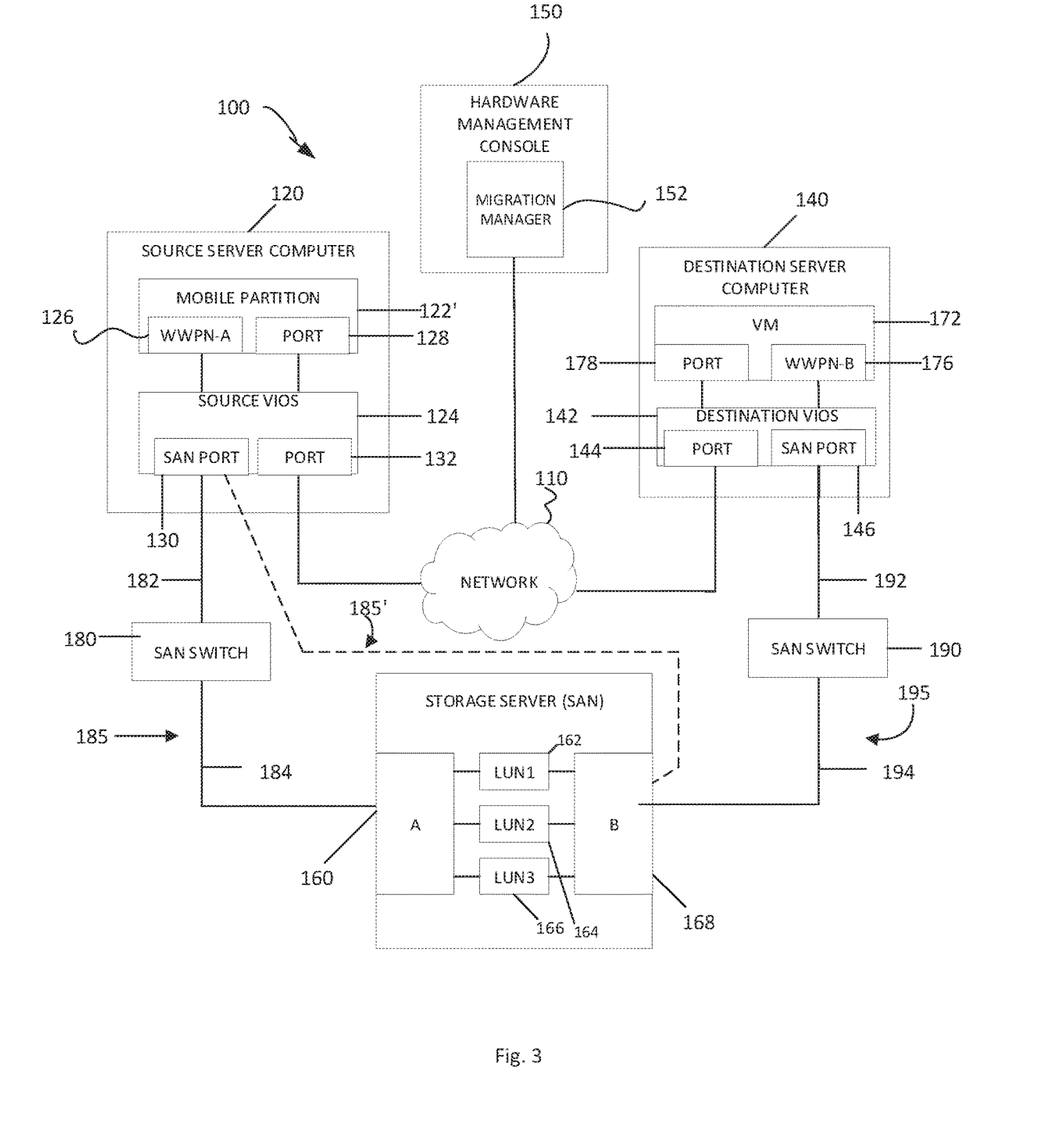
FIG. 3 is a functional block diagram illustrating a virtualized server computing environment during a live partition migration operation, in accordance with an embodiment of the present invention.

Before migration, as shown in FIG. 1, I/O path 185 from VM 122 to LUNs 162, 164, and/or 166 includes VM virtual port 126, storage port 160 on storage server 112, and LUNS 162, 164, and/or 166. In the partition migration method 200 of FIG. 2, at 210 the system initiates a partition migration (LPM), preferably a live logical partition migration or mobility for logical partition on the source server. During initiation, in an embodiment, a virtual machine on the source server, is identified to be migrated, e.g., the mobile partition, to another server, e.g., the target or destination server. FIG. 3 is a functional block diagram illustrating environment 100 at a point in time when a logical partition migration, preferably a live logical partition transfer or migration (LPM) is initiated, and a VM has been identified to be migrated from source server 120 to target or destination server 140. The VM identified for migration is designated mobile partition 122' in FIG. 3.

Before the virtual machine or LPAR is migrated or transferred to the target or destination server, the system may undergo a validation process. In an embodiment, a controlling computer, such as, for example, a hardware management console (HMC), may undertake a validation process that may include, for example, verifying that the destination computer server has enough resources available to support the mobile partition. The validation process may include other operations, such as, for example, determining the access ports through which the source server and destination server accesses the storage server. For example, at 220, the system may determine whether or not the source server has or uses the same access (target) port on the storage server or storage area network (SAN) as the destination server uses to access the storage server or SAN. During the validation process it will be known and/or determined that the destination (target) server does not have access to the same ports on the SAN (storage server) as the source server on which the initiator VM resides. As part of the initiation process in a partition migration operation, in an exemplary embodiment, the managing console, e.g., HMC, notifies the mobile partition (e.g., mobile partition 122') that the destination server will not have access to the same storage ports as the source server. For example, in FIG. 3, migration manager 152 notifies the mobile partition 122' that the destination server 140 will not have access to the storage ports 160.

If the source server has access to the same access (target) port on the storage server or SAN as the destination server, then the process goes to 240 where the mobile partition is migrated. On the other hand, if the source server does not have access to the same access (target) port on the storage server or SAN as the destination server, then at 230 a new I/O path for the mobile partition on the source server will be created. The new I/O path will be created for the mobile partition to the ports on the storage server (SAN) with which the destination server communicates. In an exemplary embodiment in the virtualization environment of FIG. 3, the new I/O path 185' for the mobile partition on the source server 120 will include port 168 on SAN 112. New I/O path 185' is created for mobile partition 122' on source server 120 that includes initiator mobile partition 122' (e.g., virtual port 126), target port 168, and LUNs 162, 164, and/or 166. In an embodiment, the operating system of the mobile partition 122' stores the new I/O path 185' used to access LUNs 162, 164, and/or 166. As the new I/O path 185' for the mobile partition 122' is not valid from the source server 120 because the source server 120 does not have access to storage port 168, mobile partition 122' does not use new I/O path 185', but rather I/O path 185' is marked or configured to be in the failed, error, or inactive state.

At 240, the mobile partition is migrated to the destination server. When mobile partition 122' is migrated to destination server 140 as migration partition 322, it may first try to access LUNs 162, 164, and/or 166 from the first I/O path 185 that no longer works because storage port 160 is not accessible to destination server 140. When first I/O path 185 fails, migrated partition 322 will switch to I/O path 185' that was created as part of the migration operation. The new I/O path 185' now works because storage port 168 is accessible from the destination server 140.

Figure 4:
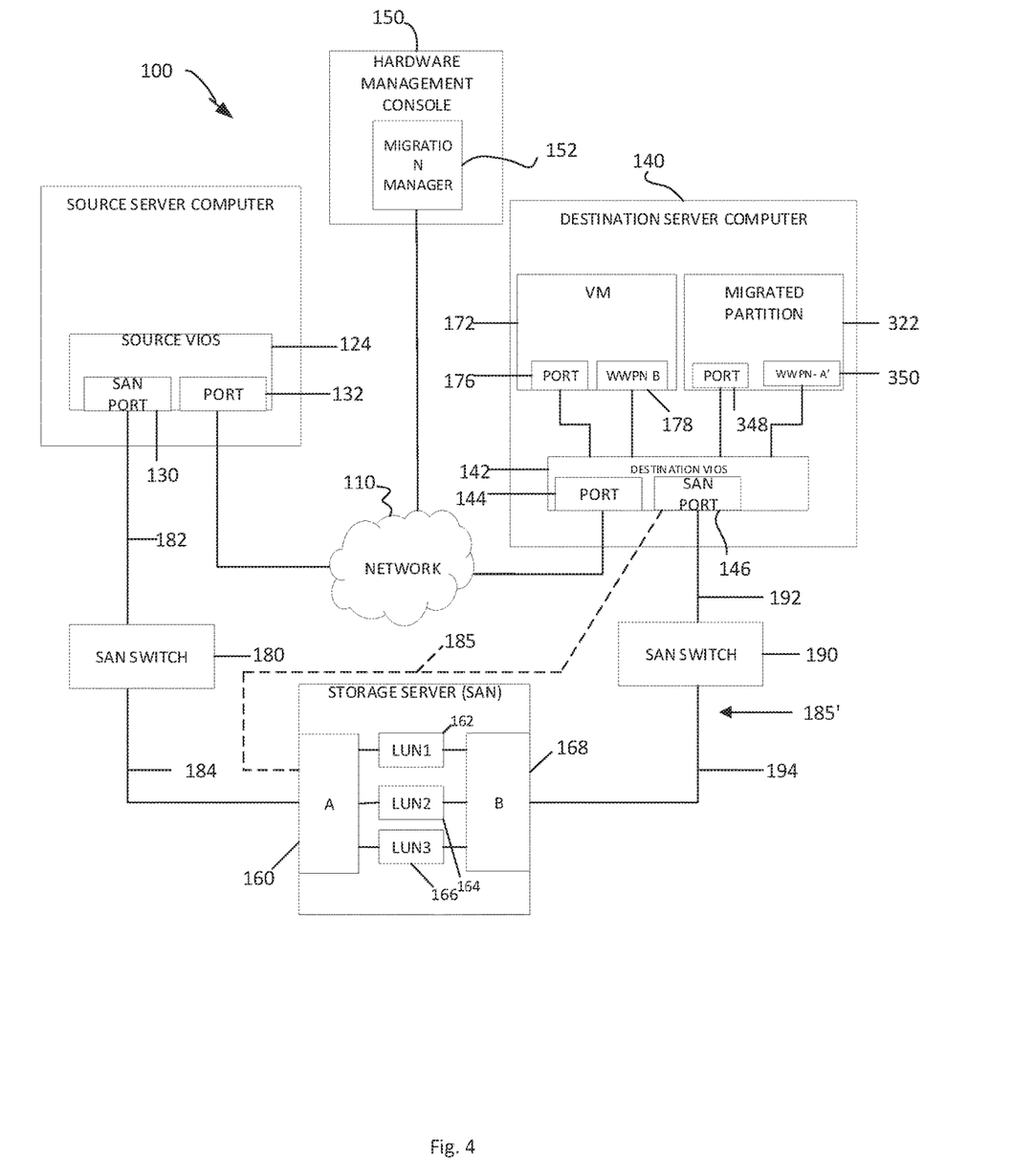
FIG. 4 is a functional block diagram illustrating a virtualized server computing environment following live partition migration operation, in accordance with an embodiment of the present invention.

FIG. 4. depicts environment 100 during the partition transfer operation after a copy of mobile partition 122' has been migrated to destination server computer 140. The copy of mobile partition 122' on destination server 140 is generally designated as migrated partition 322. Migrated partition is a virtual machine that is operational on destination server 140. As part of the partition transfer operation, migrated partition 322 generates its own virtual port connections with destination VIOS 142. In the depicted embodiment, migrated partition 322 generates port 348 to communicate virtually with port 144. In the depicted embodiment, port 348 is a virtual Ethernet port that supports communication between migrated partition 322 and other computer systems (e.g., hardware management console 150 and source server computer 120) via network 110. In general, port 348 can be any virtualized port utilized by migrated partition 322 to communicate with computer systems via network 110. Migrated partition 322 also includes WWPN-A' 350. In the depicted embodiment, WWPN-A' 350 represents a virtualized port (e.g., virtual Fibre channel port) that is identified by a WWPN. WWPN-A' 350 can be used to communicate with a storage device (e.g., a disk) via storage area network (SAN) 112 on behalf of migrated partition 322. Virtual port WWPN-A' 350 on migrated partition 322 communications with physical port SAN port 146. That is, in FIG. 3, SAN port 146 is a physical port that facilitates communication between migrated partition (or virtual machine) 322 and SAN 112, and more specifically SAN port 146 is a physical fibre channel port that communicates with migrated partition 322 via a fibre channel connection addressed to WWPN-A' 350.

Figure 5:
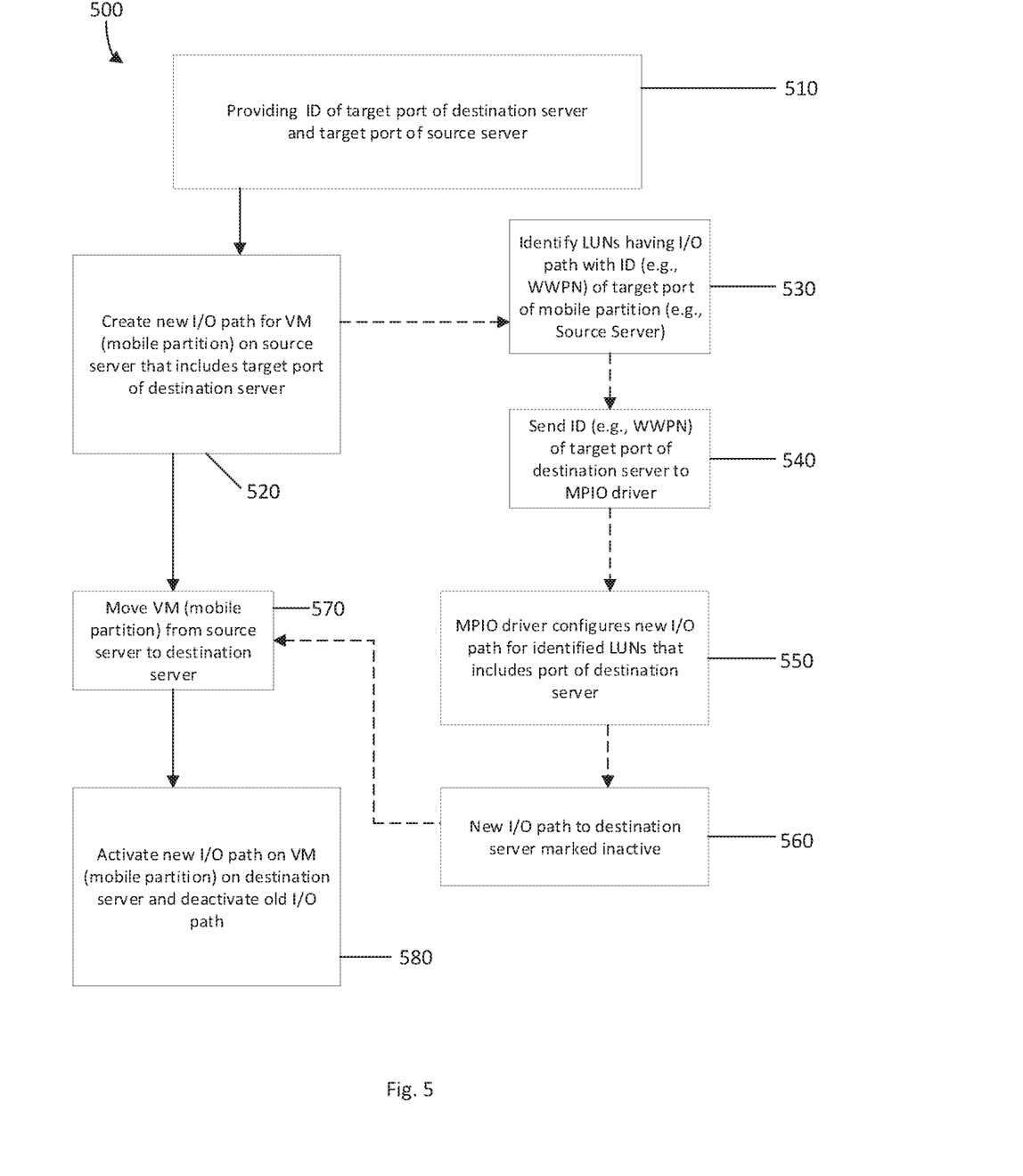
FIG. 5 is a flowchart depicting operational steps of a live migration in accordance with an embodiment of the invention.

FIG. 5 is an exemplary flowchart in accordance with one embodiment illustrating and describing a method of performing logical partition migration or transfer, more preferably live partition mobility, in accordance with one or more embodiments of the present disclosure. While the migration method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

In the migration method 500 of FIG. 5, the system initiates a logical partition migration (LPM) operation. During initiation, in an embodiment, a virtual machine on the source server, is identified to be migrated e.g., the mobile partition, to another server, e.g., the target or destination server. FIG. 3 is a functional block diagram illustrating environment 100 at a point in time when a partition migration (LPM) is initiated and a VM has been identified to be migrated from source server 120 to target or destination server 140. The VM identified for migration is designated mobile partition 122' in FIG. 3.

During the migration process, the system and/or process may undergo a validation operation as described above. In an embodiment, it will be known and/or determined that the destination (target) server does not have access to the same ports on the SAN (storage server) as the source server on which the VM resides. That is, as part of LPM initiation and/or validation process, in an exemplary embodiment, the system checks and/or determines whether the destination server accesses the storage server or SAN through the same port that the source server on which the mobile partition resides accesses the storage server or SAN. In an embodiment, the system, e.g., migration manager, notifies the mobile partition (e.g., mobile partition 122') that the destination server will not have access to the same ports on the storage server or SAN as the source server. For example, in FIG. 3, migration manager 152 on HWC 150 notifies the mobile partition 122' that the destination server 140 will not have access to the storage ports 160.

The source server, in an embodiment, is not aware of the identification (WWPN) of the target port (e.g., target port 168) that corresponds to the destination server (e.g., destination server 140). In the migration method 500 of FIG. 5, in an embodiment, at 510 a user provides the identification (ID) of the target port of the source server and the identification (ID) of the target port of the destination server. In the case of a virtualized environment, this typically includes the WWPN of the target port that the destination server uses or is configured to access the storage server or SAN (e.g., in FIG. 1, target port 168 of the SAN 112), and the WWPN of the target port that the source server uses or is configured to access the storage server or SAN (e.g., in FIG. 1, target port 160 of the SAN 112). The information on the identification (e.g., WWPNs) of the target ports of the destination and source servers may be provided, determined, and/or stored in the migration command (e.g., migration manager 152) on the management console (e.g., Hardware Management Console (HWC) 150). While in the exemplary embodiment, a user provides the ID (e.g., WWPN) of the target ports that the source and destination servers sue to access the storage server or SAN, it is contemplated that the system and/or method of migration may include other means of determining and/or providing that information to the system. For example, the system may determine the respective target ports that the respective computer servers are configured to use to access the storage server or SAN.

At 520, a new I/O path is created for the virtual machine that is being migrated, e.g., mobile partition 122', while that virtual machine (e.g., mobile partition 122') is on the source server (e.g., source server 120). This process is schematically illustrated in FIG. 3 with new I/O path 185'. New I/O path 185' includes the target port that the destination server uses or is configured to use to access the storage server or SAN (e.g., target port 168). New I/O path 185' includes the LUNs (e.g., disks) on the SAN that are accessible by the mobile partition while the mobile partition is on the source server, and includes the target port on the SAN that is accessible by the destination server. For example, in FIG. 3 new I/O path 185' includes target port 168 on the storage server or SAN 112. Creating a new I/O path may include one or more subprocesses or operations, and in one embodiment may include the management console executing a command using a Remote Management and Control (RMC) connection on the logical partition (virtual machine) on the source server.

Creating a new I/O path for the mobile partition may include at 530, searching for and/or identifying the LUNs (e.g., storage disks) accessible by the mobile partition 122' on source server. For example, in FIG. 3, the system would search for and identify all the LUNs (e.g., storage disks) accessible by mobile partition 122' on source server 120. The process may further include searching for and/or identifying the target port(s) on the storage server (SAN) used to access all the LUNs (e.g., storage disks) that are accessible by the initiator, e.g., the mobile partition. In an embodiment, the LUNs having an I/O path with an ID (e.g., WWPN) of the target port of the source server may be searched for and/or identified. For example, in FIG. 1, a search would be performed to identify and list all of the LUNs (e.g., LUNs 162, 164, and 166) having an I/O path (e.g., I/O path 185) with WWPN of target port 160. For all such LUNs (e.g., disks) accessed by mobile 122' on source server 120, and identified by the search, in an embodiment, a new I/O path (e.g., 185' in FIG. 3) for the logical partition or virtual machine (VM) to be migrated (e.g., mobile partition 122') will be created with new WWPN of the target port of the destination server (e.g., target port 168). In an embodiment, for all LUNs having I/O paths with the ID (e.g., WWPN) of the target port of the logical partition, a new I/O path will be created with the ID (WWPN) of the target port of the destination server.

During new I/O path creation for mobile partition 122', the identification (e.g. WWPN) of the target port of the destination server may be sent to the Multipath I/O (MPIO) driver at 540. For example, the WWPN of port 168 of destination server 140 may be passed down through an input/output control (IOCTL) command to the MPIO driver (on the source server) by setting a flag. The MPIO driver checks the flag, and if the flag is set, the MPIO driver will create and configure necessary data for the new I/O path, e.g., the target port and the LUNs, for the mobile partition. For example, at 550, the MPIO driver configures new I/O path for the LUNs identified as being accessible to the mobile partition, and the new I/O path includes the port that the destination server uses to access the storage server or storage area network (SAN). In an exemplary embodiment, as shown in FIG. 3, the MPIO driver configures new I/O path 185' for mobile partition 122' on source server 120 that includes target port 168. In an embodiment, the new I/O path 185' for mobile partition 122' will be configured, but no commands will issue to the new I/O path that includes the new target port. In an embodiment, at 560, the new I/O path on the source server will be marked inactive, error, or failed. For example, as shown by dashed line FIG. 3, the I/O) path 185' will be configured to be inactive.

The mobile partition is moved to the destination server at 570. In an embodiment, when the mobile partition is moved to the destination server, the migration manager 152 in the management console (e.g., Hardware Management Console (HMC) 150) is used. In an embodiment, all the I/O paths (new and old) will be validated using, in an embodiment, fabric discovery. The new I/O paths for the migrated partitions (corresponding to the target port of the destination server) are activated at 580 as the new I/O path 185 can see the LUNs through the target port of the destination server. Additionally or alternatively, the old I/O path 185 for the migrated partition will be marked inactive, error, or failed since the target port of the source server is inaccessible from the destination server. In the example of FIG. 4, the new I/O path 185' for the migrated partition 322 is activated as the new I/O path 185' can see the LUNs (e.g., LUNs 162, 164, and/or 166) through target port 168 of the destination server 140. The old I/O path 185 through storage port 160 will be marked inactive, error, or failed.

The disclosed system and method permits and provides the ability to migrate a logical partition in a virtual computing environment where input and output functions (I/O) can be continued after virtual machine or logical partition migration, and in a manner so that applications preferably are not disturbed or interrupted. The disclosed system and method also provides clarity to the user or system administrator on what I/O paths are active. There is also a uniform view on the virtual machine from both source and destination servers on what paths are visible and what paths are not visible.

Figure 6:
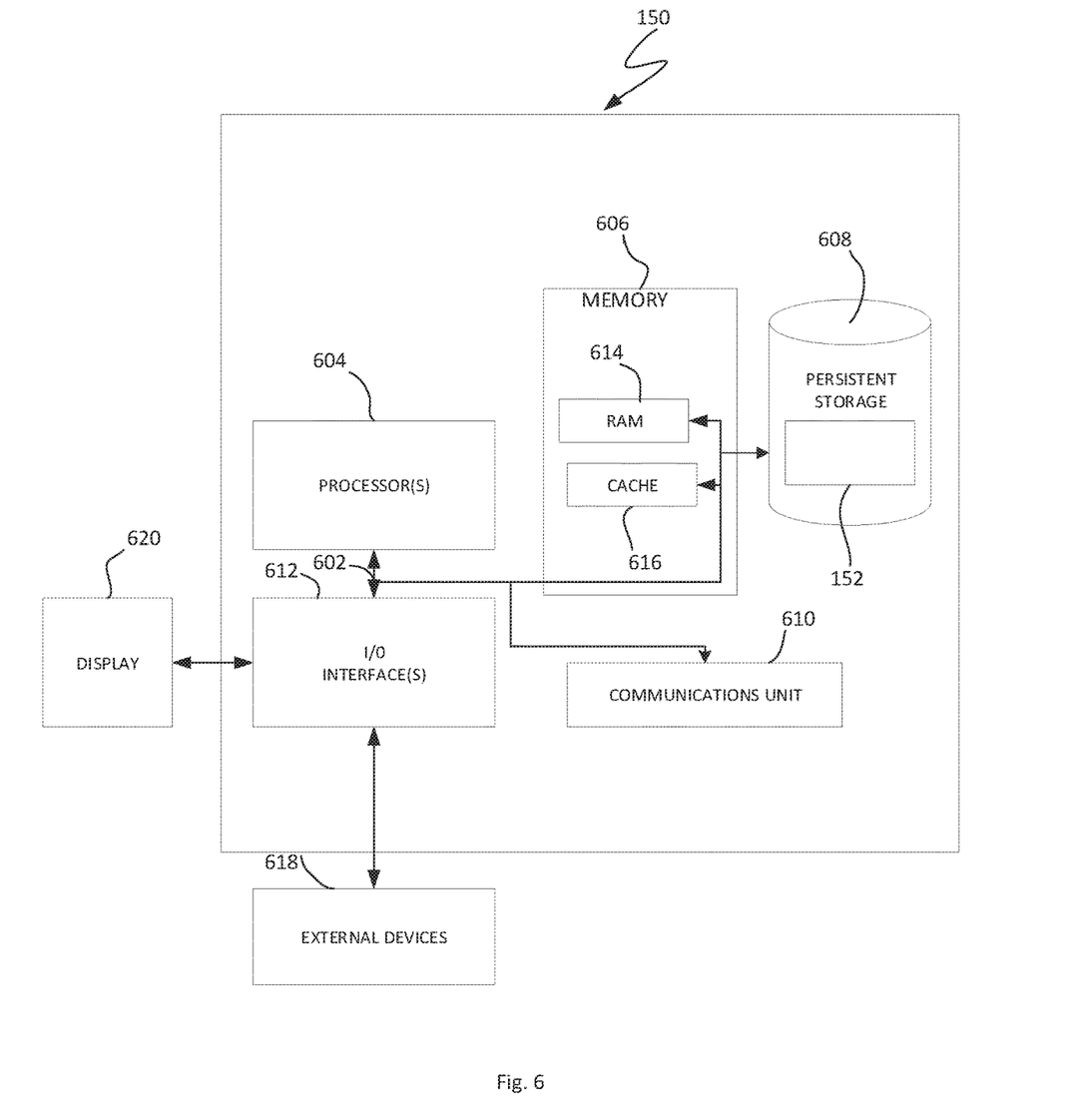
FIG. 6 depicts a block diagram of components of the hardware management console executing the live partition migration program, in accordance with an embodiment of the present invention.

FIG. 6 depicts a block diagram of components of hardware management console 150 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Hardware management console 150 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer readable storage media.

Migration manager 152 is stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of source server computer 120, destination server computer 140, and storage server 112. In these examples, communications unit 610 includes one or more network interface cards. Communications unit 610 may provide communications through the use of either or both physical and wireless communications links. Mitigation Manager 152 may be downloaded to persistent storage 608 through communications unit 610.

I/O interface(s) 612 allows for input and output of data with other devices that may be connected to hardware management console 150. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., migration manager program 152, can be stored on such portable computer-readable storage media and can be loaded onto persistent storage 608 via I/O interface(s) 612. I/O interface(s) 612 also connect to a display 620. Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of migrating resources in a computing environment, the computing environment comprising a source system, a target system and a storage server for storing data wherein the source system is configured to access the storage server and the target system is configured to access the storage server, the method comprising:
    initiating a transfer of a logical partition on the source system to the target system;
    creating a new I/O path for the logical partition on the source system while the logical partition resides on the source system;
    determining whether the source system access the storage server from the same access port that the target system accesses the storage server and transferring the logical partition from the source system to the target system.

2. The method according to claim 1, further comprising checking that the target system has the resources to support the transfer of the logical partition from the source system.

3. The method according to claim 1, wherein if the source system accesses the storage server from a different access port then the target system, then the new I/O path for the logical partition on the source server is configured to include the access port of the target system.

4. The method according to claim 1, further comprising configuring the new I/O path for the logical partition to be inactive while the logical partition resides on the source system.

5. The method according to claim 4, further comprising configuring the new I/O path for the logical partition to be active in response to transferring the logical partition to the target system.

6. The method according to claim 1, further comprising providing the identification of a target port of the source system to access a storage device and providing the identification of a target port of the target system to access the storage device.

7. The method according to claim 1, wherein the storage server has a plurality of access ports and one or more logical units (LUNs) wherein the logical partition on the source system accesses the one or more logical units (LUNs) through a first access port on the storage server, and the target system accesses the storage server through a second access port on the storage server that is different than the first access port, and further comprising configuring the new I/O path to include the second access port on the storage server.

8. The method according to claim 7, further comprising identifying the LUNs accessible by the logical partition.

9. The method according to claim 7, further identifying the LUNs having an I/O path that includes the target port by which the source system accesses the storage server.

10. The method according to claim 8, further comprising sending the identity of the second access port to the source system.

11. The method according to claim 10, wherein the identity of the second access port is sent to a Multipath Input/Output (MPIO) driver on the source system.

12. The method according to claim 10, wherein the source system configures a new I/O path for the identified LUNs on the storage server to include the second access port.

13. The method according to claim 1, wherein the new I/O path will be validated and activated using fabric discovery after migration to the target system.

14. A system providing for transfer of a logical partition, the system comprising:
    a source server having a logical partition and a Virtualized Input/Output Server (VIOS), the source server having at least one physical access port, the logical partition having at least one virtualized port for communicating with the at least one physical access port;
    a target server having a Virtualized Input/Output Server (VIOS), the target server having at least one physical access port; and
    a storage server having storage data and a plurality of access ports, wherein a first access port is configurable to be in communication with the source server and a second access port, different than the first access port, is configurable to be in communication with the target server,
    wherein the logical partition has a first I/O path that includes the first access port of the storage server; and wherein the system is configured to create a second I/O path for the logical partition while the logical partition is on the source server that includes the second access port of the storage server.

15. The system of claim 14, wherein the system is further configured such that the new I/O path is inactive while on the source server.

16. The system of claim 14, wherein the system is further configured to migrate the logical partition configured with the new I/O path that includes the second access ports to the target server.

17. The system of claim 16, wherein the system is further configured to activate the new I/O path and deactivate the old I/O path after migration of the logical partition to the target server.

18. A method of migrating resources in a computing environment, the computing environment comprising a source system, a target system and a storage server having a plurality of access ports and one or more logical units (LUNs), wherein a logical partition on the source system accesses the one or more logical units (LUNs) through a first access port on the storage server, and the target system accesses the storage server through a second access port on the storage server that is different than the first access port, the method comprising:

initiating a transfer of a logical partition on the source system to the target system;

creating a new I/O path for the logical partition on the source system while the logical partition resides on the source system;

transferring the logical partition from the source system to the target system, and configuring the new I/O path to include the second access port on the storage server.

19. The method according to claim 18, further comprising identifying the LUNs accessible by the logical partition.

20. The method according to claim 18, further comprising identifying the LUNs having an I/O path that includes the target port by which the source system accesses the storage server.

* * * * *